UNITED STATES PATENT OFFICE.

RICHARD S. RHODES AND EBENEZER WHYTE, OF CHICAGO, ILLINOIS.

IMPROVED PROCESS FOR PRESERVING EGGS.

Specification forming part of Letters Patent No. 51,480, dated December 12, 1865; Reissue No. 2,157, dated January 23, 1866.

*To all whom it may concern:*

Be it known that we, RICHARD S. RHODES and EBENEZER WHYTE, of the city of Chicago, in the county of Cook and State of Illinois, have invented and discovered a new and useful Improved Process for Preserving Eggs; and we do hereby declare and make known that the following is a full, clear, and exact description of the same, sufficient to enable those skilled in the art to use and practice it.

The nature of our said invention consists in a novel mode of treating eggs, hereinafter to be fully described, whereby they may be kept and preserved from decay and in their fresh and natural state, with their vitality unimpaired for years.

To enable those skilled in the art to make use of and practice our invention, we will proceed to describe the same with particularity.

The eggs to be treated must be fresh merchantable eggs, and are first chilled by means of ice or in an ice-house, or in any other suitable manner, to a temperature of from about 35° to 40° above zero. We then take sound oats, bran, or any other suitable packing material and dry it thoroughly in any convenient manner, when said packing is chilled to about the same temperature as the eggs. The eggs are then carefully and securely packed in the oats or other material, all being arranged upon one end in barrels, casks, or other suitable packages, which are then stored in an ice-house or other appropriate room, in which, by the application of ice or otherwise, the eggs are kept a uniform temperature, not varying from about 35° or 40° above zero, as aforesaid.

Instead of first chilling the eggs and the packing before the eggs are packed, if desired, the eggs may be packed in the packing material first, and the whole be chilled to the proper temperature, as aforesaid, by placing them in the ice-house or other room of the requisite temperature for storage and subsequent treatment.

As the object of packing the eggs in oats or other material is simply to prevent breakage, it is obvious that the result of the process would be the same in respect to the preservation of the eggs from decay whether the packing material be used or not.

Once in from five to seven days, or thereabout, the packages containing the eggs must be turned over, so as to bring the upper ends of the eggs as first arranged downward, and by successive turnings, care being taken not to displace the eggs, the eggs are turned alternately upon one end and the other during the whole time the process is continued, which may be for one or more years, as desired.

By this process eggs may be kept in their fresh natural state for a long time without losing their vitality, so that by incubation chickens may be hatched therefrom. By arranging the eggs upon one end, as described, eggs may be kept much longer than by arranging them upon the side; but we do not intend to limit our claim by confining ourselves to that method of arrangement, as eggs when laid upon the side may be kept many months by our process, which is generally long enough for all practical purposes.

We claim as our invention—

The herein-described process for preserving eggs from decay, substantially as herein specified.

RICHARD S. RHODES.
EBENEZER WHYTE.

Witnesses:
FRANKLIN H. BROWN,
W. E. MANZ.